US008038766B2

(12) United States Patent
Orth et al.

(10) Patent No.: US 8,038,766 B2
(45) Date of Patent: *Oct. 18, 2011

(54) DIRECT REDUCTION PROCESS USING A SINGLE FLUIDISED BED

(75) Inventors: Andreas Orth, Friedrichsdorf (DE);
Heinz Eichberger, Bad Soden (DE);
Donald Keith Philp, Bibra Lake (AU);
Jeantine Van Gemund, legal representative, Bibra Lake (AU); Rod Dry, City Beach (AU)

(73) Assignee: Outotec Oyj, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/569,736

(22) PCT Filed: May 20, 2005

(86) PCT No.: PCT/EP2005/005472
§ 371 (c)(1),
(2), (4) Date: Feb. 26, 2008

(87) PCT Pub. No.: WO2005/116280
PCT Pub. Date: Dec. 8, 2005

(65) Prior Publication Data
US 2008/0196549 A1 Aug. 21, 2008

(30) Foreign Application Priority Data
May 31, 2004 (AU) ................................ 2004902900

(51) Int. Cl.
*C21B 13/00* (2006.01)
(52) U.S. Cl. ............... 75/448; 75/433; 75/443; 75/444; 75/447; 75/451; 75/452; 423/138; 423/148
(58) Field of Classification Search ................ 75/444, 75/447, 448, 451; 266/218
See application file for complete search history.

(56) References Cited

U.S. PATENT DOCUMENTS
3,753,685 A * 8/1973 Tajima et al. .................. 75/444
(Continued)

FOREIGN PATENT DOCUMENTS
EP 0617136 9/1994
(Continued)

OTHER PUBLICATIONS
Patience et al., Advances in Engineering Fluid Mechanics, 1996, Gulf Professional Publishing, p. 262 and 278-9.*
Van Der Berg et al., Fluidized-bed reduction of fine iron ore by the in-situ combustion of coal, Apr. 1989, Journal of South African Institute of Mining and Metallurgy, vol. 89, No. 4, p. 89-98.*

(Continued)

Primary Examiner — Jerry A Lorengo
Assistant Examiner — Jared Wood
(74) Attorney, Agent, or Firm — Chernoff, Vilhauer, McClung & Stenzel

(57) ABSTRACT

A direct reduction process for a metalliferous material includes supplying the metalliferous material, a solid carbonaceous material, an oxygen-containing gas, and a fluidizing gas into a fluidized bed in a vessel and maintaining the fluidized bed in the vessel, at least partially reducing metalliferous material in the vessel, and discharging a product stream that includes the partially reduced metalliferous material from the vessel. The process comprises (a) reducing the metalliferous material in a solid state in a metal-rich zone in the vessel; (b) injecting the oxygen-containing gas into a carbon-rich zone in the vessel with a downward flow in a range of ±40° to the vertical and generating heat by reactions between oxygen and the metalliferous material (including metallized material), the solid carbonaceous material and other oxidizable solids and gases in the fluidized bed, and (c) transferring heat from the carbon-rich zone to the metal-rich zone by movement of solids within the vessel. The metal-rich zone is formed in a lower section of the vessel and the carbon-rich zone is an intermediate section below an upper section of the vessel. Oxygen-containing gas is injected into a central region of the vessel.

41 Claims, 2 Drawing Sheets

U.S. PATENT DOCUMENTS

Figure 1:
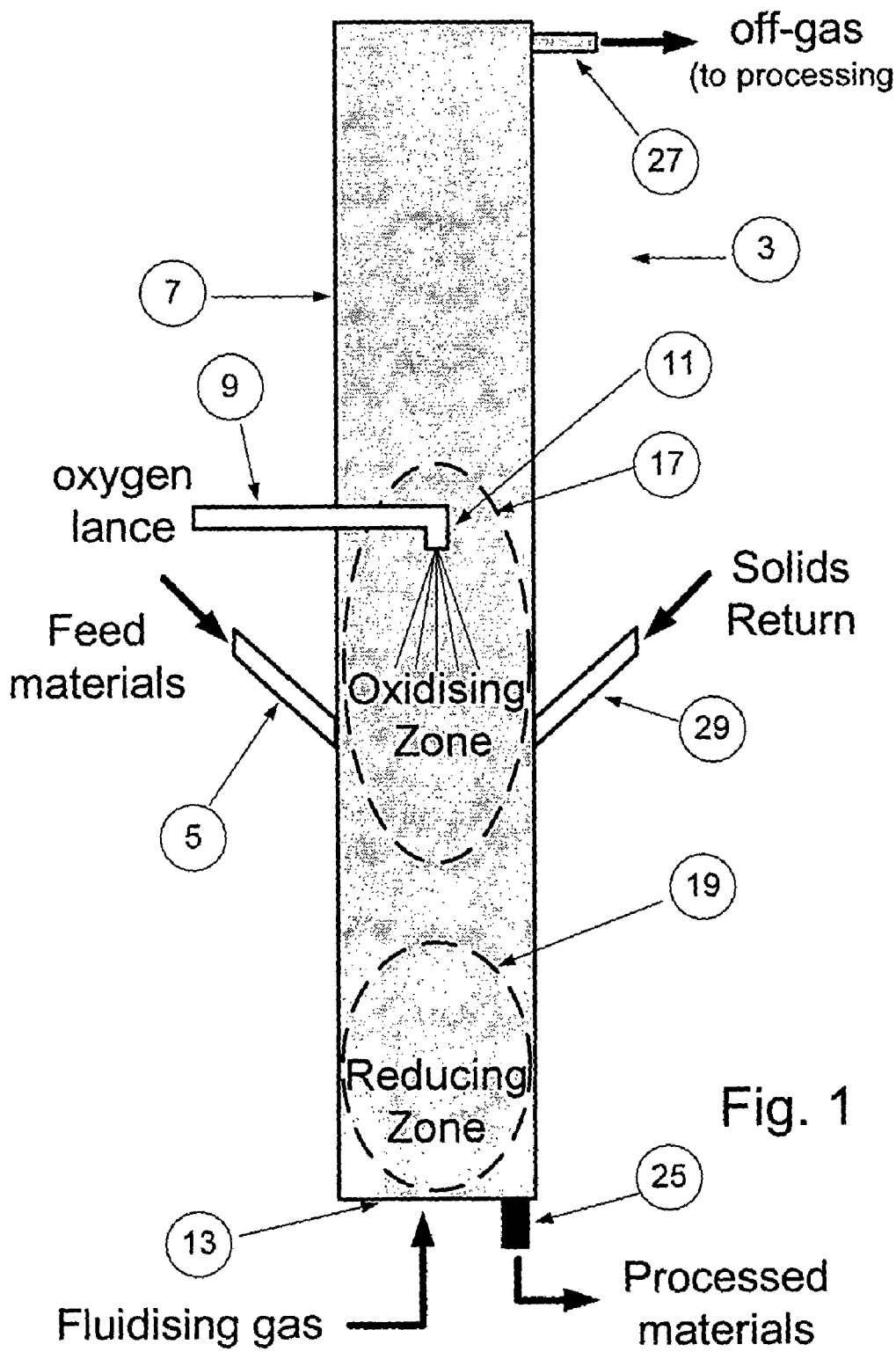

| | | | |
|---|---|---|---|
| 4,084,958 A * | 4/1978 | Collin et al. | 75/448 |
| 4,359,212 A * | 11/1982 | Bengtsson et al. | 266/172 |
| 4,374,663 A * | 2/1983 | Collin et al. | 75/448 |
| 4,930,757 A * | 6/1990 | Manwell et al. | 266/270 |
| 5,433,767 A * | 7/1995 | Bresser et al. | 75/446 |
| 5,445,667 A | 8/1995 | Malmstroem et al. | |
| 5,542,963 A * | 8/1996 | Sherwood | 75/382 |
| 5,560,762 A * | 10/1996 | Bresser et al. | 75/447 |
| 5,810,905 A * | 9/1998 | Shultz | 75/10.46 |
| 6,446,565 B2 * | 9/2002 | Stricker et al. | 110/182.5 |

FOREIGN PATENT DOCUMENTS

JP       10280021        10/1998

OTHER PUBLICATIONS

Weber et al., Circofer: A Low Cost Approach to DRI Production, Sep. 1, 1994, Iron and Steel Engineer, vol. 71, iss. 9.*

Srinivasan, Reduction of iron oxides by carbon in a circulating fluidized bed reactor, 2002, Powder Technology, vol. 124, p. 28-39.*

* cited by examiner

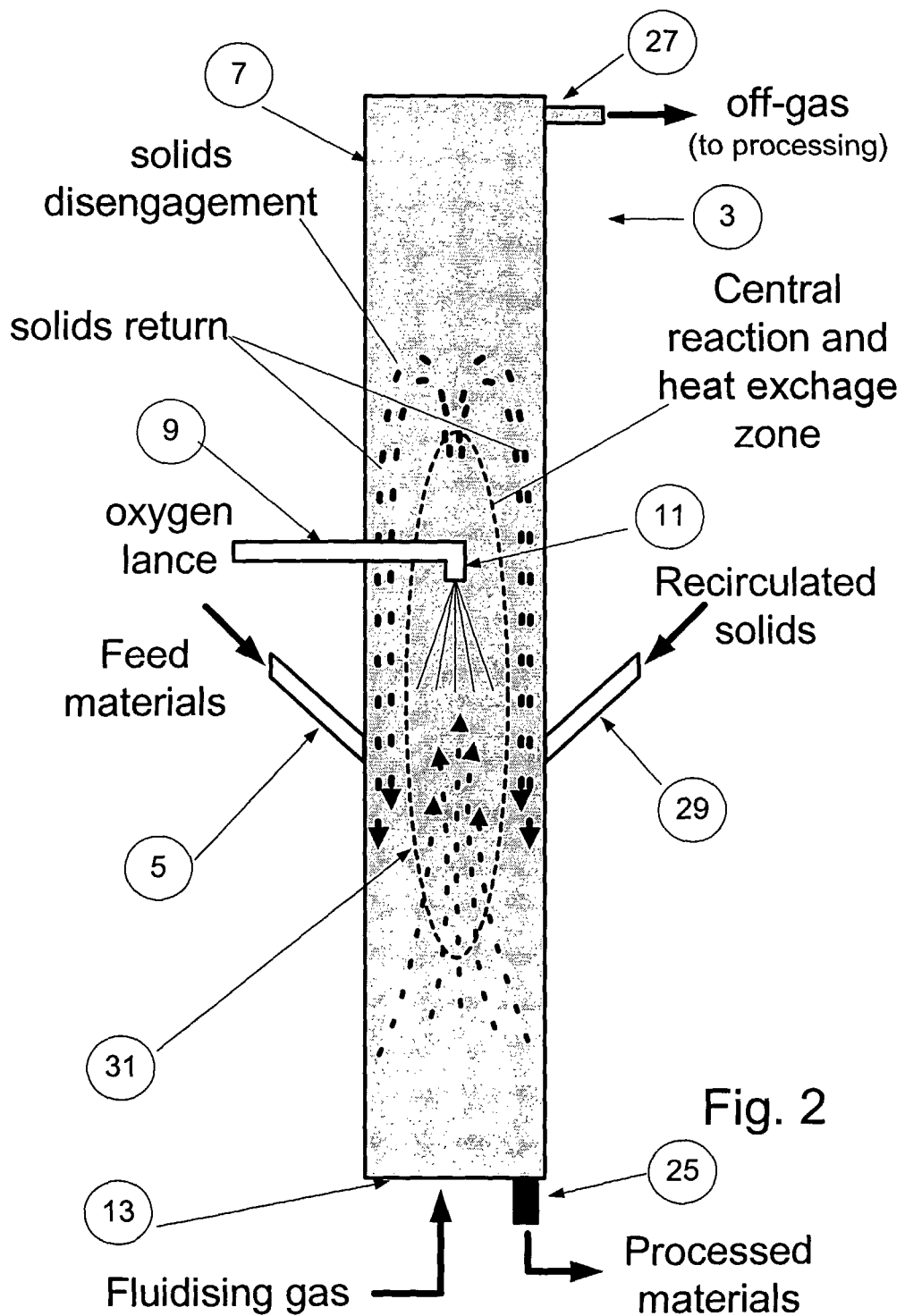

DIRECT REDUCTION PROCESS USING A SINGLE FLUIDISED BED

This is a national stage application filed under 35 USC 371 based on International Application No. PCT/EP2005/005472 filed May 20, 2005, and claims priority under 35 USC 119 of Australian Patent Application No. 2004902900 filed May 31, 2004.

The present invention relates to a direct reduction process for a metalliferous feed material, particularly, although by no means exclusively, to a direct reduction process for an iron-containing feed material, such as iron ore.

The present invention also relates to a process for reducing a metalliferous feed material that comprises a direct reduction process for partially reducing metalliferous feed material in the solid state and a smelting process for melting and further reducing the partially reduced metalliferous feed material to a molten metal.

The present invention was made during the course of an on-going research project carried out by the applicant to develop the so called "CIRCOFER technology" for the direct reduction of iron ore.

CIRCOFER technology is a direct reduction process that is capable of reducing iron ore in the solid state to a metallisation of 50% or higher.

CIRCOFER technology is based on the use of fluidised beds. The main feed materials to the fluidised beds are fluidising gas, metal oxides (typically iron ore fines), solid carbonaceous material (typically coal) and oxygen-containing gas (typically oxygen gas). The main product produced in the fluidised beds is metallised metal oxides, i.e. metal oxides that have been at least partially reduced.

One of the findings of the applicant in the research project is that it is possible to establish separate reaction zones within a single fluidised bed and to optimise the reactions in these zones. One reaction zone is a carbon-rich zone in which solid carbonaceous material, such as coal, and other oxidisable reactants are oxidised and generate heat. The other reaction zone is a metal-rich zone in which metalliferous feed material, such as iron ore, is reduced in the solid state. The two reaction zones are spaced apart within the fluidised bed, with the metal-rich zone typically being in a lower section and the carbon-rich zone being spaced above the metal-rich zone. The zones may be contiguous. The fluidised bed comprises upward and downward flows of solids and this movement of material facilitates transfer of heat generated in the carbon-rich zone to the metal-rich zone and maintains the metal-rich zone at a temperature required for reducing the metalliferous feed material.

According to the present invention there is provided a direct reduction process for a metalliferous material which comprises supplying the metalliferous material, a solid carbonaceous material, an oxygen-containing gas, and a fluidising gas into a fluidised bed in a vessel and maintaining the fluidised bed in the vessel, at least partially reducing metalliferous material in the vessel, and discharging a product stream that comprises the at least partially reduced metalliferous material from the vessel, which process is characterised by: (a) reducing the metalliferous material in a solid state in a metal-rich zone in the vessel; (b) injecting the oxygen-containing gas into a carbon-rich zone in the vessel with a downward flow in a range of plus or minus 40 degrees to the vertical and generating heat by reactions between oxygen and the metalliferous material (including metallised material), the solid carbonaceous material and other oxidisable solids and gases in the fluidised bed, and (c) transferring heat from the carbon-rich zone to the metal-rich zone by movement of solids within the vessel.

Preferably the process comprises injecting the oxygen-containing gas with a downward flow in a range of plus or minus fifteen degrees to the vertical.

The term "carbon-rich" zone is understood herein to mean a region in the fluidised bed in which there is a relatively large amount of carbon-containing material in relation to the amount of metalliferous material than in other regions of the fluidised bed.

The term "metal-rich" zone is understood herein to mean a region in the fluidised bed in which there is a relatively large amount of metalliferous material in relation to the amount of carbon-containing material than in other regions of the fluidised bed.

Preferably the process comprises forming the metal-rich zone in a lower section of the vessel and the carbon-rich zone in an intermediate section of the vessel.

Preferably the intermediate section is intermediate said lower section and an upper section of the vessel.

Preferably the process comprises injecting the oxygen-containing gas into a central region in the vessel, i.e. a region that is located inwardly of a side wall of the vessel.

Preferably the process comprises controlling the temperature difference between the bulk temperature in the fluidised bed and the average temperature of the inwardly facing surface of a side wall of the vessel to be no more than a 100° C.

The term "bulk temperature" is understood herein to mean the average temperature throughout the fluidised bed.

More preferably the temperature difference is no more than 50° C.

In the case of reducing metalliferous material in the form of iron ore fines, preferably the bulk temperature in the fluidised bed is in the range 850° C. to 1000° C.

Preferably the bulk temperature in the fluidised bed is at least 900° C., more preferably at least 950° C.

In addition, preferably the process comprises controlling the temperature variation to be less than 50° C. within the fluidised bed.

The temperature difference may be controlled by controlling a number of factors including, by way of example, the amounts of the solids and the gases supplied to the vessel.

Furthermore, in the case of reducing metalliferous material in the form of iron ore fines, preferably the process comprises controlling the pressure in the vessel to be in the range of 1-10 bar absolute and preferably 4-8 bar absolute.

Preferably the process comprises injecting the oxygen-containing gas so that there is a downward flow of the gas in the vessel.

Preferably the process comprises injecting the oxygen-containing gas via at least one lance having a lance tip with an outlet positioned in the vessel inwardly of the side wall of the vessel in the central region of the vessel.

Preferably the lance tip is directed downwardly.

More preferably the lance tip is directed vertically downwardly.

The position of the lance and, more particularly, the height of the outlet of the lance tip, is determined by reference to factors, such as the oxygen-containing gas injection velocity, the vessel pressure, the selection and amounts of the other feed materials to the vessel, and the fluidised bed density.

Preferably the process comprises water-cooling at least the lance tip to minimise the possibility of accretions forming on the lance tip that could block the injection of the oxygen-containing gas.

Preferably the process comprises water cooling an outer surface of the lance. Preferably the process comprises injecting the oxygen-containing gas through a central pipe of the lance.

Preferably the process comprises injecting the oxygen-containing gas with sufficient velocity to form a substantially solids-free zone in the region of the lance tip to minimise the formation of accretions on the lance tip that could block the injection of the oxygen-containing gas.

Preferably the process comprises injecting nitrogen and/or steam and/or other suitable shrouding gas and shrouding the region of the outlet of the lance tip to minimise oxidation of metal that could result in accretions forming on the lance tip that could block the injection of the oxygen-containing gas.

Preferably the process comprises injecting the shrouding gas into the vessel at a velocity that is at least 60% of the velocity of the oxygen-containing gas.

Preferably the process comprises supplying the metalliferous feed material, the carbonaceous material, the oxygen-containing gas, and the fluidising gas to the fluidised bed and maintaining the fluidised bed with (a) a downward flow of the oxygen-containing gas, (b) an upward flow of solids and fluidising gas countercurrent to the downward flow of the oxygen-containing gas, and (c) a downward flow of solids outwardly of the upward flow of solids and fluidising gas.

In the fluidised bed described in the preceding paragraph, solids in the upward and downward flows of solids are heated by heat generated by reactions between the oxygen-containing gas, the solid carbonaceous material and other oxidisable materials (such as CO, volatiles, and $H_2$) in the carbon-rich zone. The solids in the downward flow of solids transfer heat to the metal-rich zone.

In addition, the upward and downward flows of solids shield the side wall of the vessel from radiant heat generated by reactions between the oxygen-containing gas and the solid carbonaceous material and other oxidisable solids and gases in the fluidised bed.

In the case of reducing metalliferous material in the form of iron ore fines, preferably the fines are sized at minus 6 mm.

Preferably the fines have an average particle size in the range of 0.1 to 0.8 mm.

One of the advantages of the process is that it can accept a substantial amount of metalliferous feed material with a particle size of less than 100 microns without a significant amount of this material exiting the process entrained in off-gas. This is believed to be due to an agglomeration mechanism operating within the fluidised bed that promotes a desirable level of agglomeration between particles of feed materials, particularly sub-100 micron particles, without appearing to promote uncontrolled agglomeration capable of interrupting operation of the fluidised bed. Similarly, friable ores that have a tendency to break down during processing and to thereby increase the proportion of particles in the fluidised bed with a size of less than 100 microns may be processed without significant loss of feed material in process off-gas.

Preferably the carbonaceous material is coal. In such a situation, the process devolatilises the coal to char and at least part of the char reacts with oxygen and forms CO in the fluidised bed.

Preferably the fluidising gas comprises a reducing gas, such as CO and $H_2$.

Preferably the process comprises selecting the amount of $H_2$ in the fluidising gas to be at least 15% by volume of the total volume of CO and $H_2$ in the gas.

Preferably the process comprises discharging the product stream comprising at least partially reduced metalliferous material from the lower section of the vessel.

Preferably the product stream also comprises other solids (for example char).

Preferably the process comprises separating at least a portion of the other solids from the product stream.

Preferably the process comprises returning the separated solids to the vessel.

Preferably the process comprises discharging an off-gas stream containing entrained solids from an upper section of the vessel.

Preferably the process comprises separating solids from the off-gas stream.

Preferably the process comprises maintaining a circulating fluidised bed by separating entrained solids from the off-gas stream and returning the solids separated from the off-gas to the vessel.

Preferably the process comprises returning solids separated from the off-gas to the lower portion of the vessel.

Preferably the process comprises preheating metalliferous feed material with the off-gas from the vessel.

Preferably the process comprises treating the off-gas after the preheating step and returning at least a portion of the treated off-gas to the vessel as the fluidising gas.

Preferably the off-gas treatment comprises one or more of (a) solids removal, (b) cooling, (c) $H_2O$ removal; (d) $CO_2$ removal, (e) compression, and (f) reheating.

Preferably the off-gas treatment comprises returning solids to the vessel.

The process may be operated to produce a product stream ranging from low to high metallisation depending on the downstream requirements for the at least partially reduced metalliferous material. The metallisation may range from 30 to in excess of 80%. In situations in which metallisation greater than 50% is required, preferably the process comprises operating with reducing gas in the fluidising gas. One option for the fluidising gas in this instance is treated off-gas from the vessel. In situations in which metallisation less than 50% is required, it is envisaged that it will not be necessary to operate with reducing gas in the fluidising gas and sufficient reductant can be obtained via solid carbonaceous material supplied to the process.

The oxygen-containing gas may be any suitable gas.

Preferably the oxygen-containing gas comprises at least 90% by volume oxygen.

According to the present invention there is also provided a process for reducing a metalliferous material that comprises (a) a direct reduction process for partially reducing metalliferous material in a solid state as described herein and (b) a smelting process for melting and further reducing the partially reduced metalliferous material to a molten metal.

The present invention is described further with reference to the accompany drawings, of which:

FIG. 1 is a diagram of an apparatus for direct reduction of a metalliferous material by one embodiment of a process in accordance with the present invention which illustrates the reaction zones formed by the process within the vessel shown in the Figure; and FIG. 2 is the same basic diagram as that shown in FIG. 1 which illustrates the movement of solids and gases in the vessel caused by the process.

The following description is in the context of direct reduction of a metalliferous material in the form of iron ore particles in the solid state. The present invention is not so limited and extends to direct reduction of other iron-containing materials (such as ilmenite) and more generally to other metalliferous materials.

The following description is also in the context of direct reduction of iron ore with coal as a solid carbonaceous material, oxygen as an oxygen-containing gas, and a mixture of at least CO, and $H_2$ as a fluidising gas. The present invention is not so limited and extends to the use of any other suitable solid carbonaceous material, oxygen-containing gas, and fluidising gas.

With reference to the Figures, the solid feed materials, namely iron ore fines and coal, oxygen and fluidising gas are supplied to the vessel 3 shown in the Figures and establish a fluidised bed in the vessel.

The solid feed materials are supplied to the vessel via a solids delivery device such as screw feed or solids injection lance 5 that extends through a side wall 7 of the vessel.

The oxygen is injected into the vessel via a lance 9 having an outlet located within a downwardly extending lance tip 11 that directs the oxygen downwardly in a central region 31 (FIG. 2) of the vessel. The central region extends radially from a central axis of the vessel toward the vessel wall. The oxygen is injected so as to have a downward flow directed in the range between vertical and forty degrees to the vertical but is preferably within the range of vertical to fifteen degrees to the vertical. Solids within the region of the lance outlet may become entrained in the oxygen flow. The interaction between the substantially downward flow of oxygen and the substantially upward flow of fluidising gas is believed to significantly reduce the tendency for particles entrained in the oxygen flow to contact side walls of the vessel and form accretions.

The fluidising gas is injected via a series of tuyeres or nozzles (not shown) in a base 13 of the vessel.

The above-described supply of solids and gases produces an upward flow of fluidising gas and entrained solids in the central region of the vessel. Increasingly, as the solids move upwardly, the solids disengage from the upward stream of fluidising gas and flow downwardly in an annular region between the central region and the side wall of the vessel. These recirculated solids are either entrained again in the upward stream of fluidising gas or are discharged from the vessel. This movement of material in the vessel is illustrated in FIG. 2.

The above-described supply of solids and gases also produces the following reactions in the vessel.

Devolatilisation of coal to char and decomposition of coal volatiles to gaseous products (such as $H_2$ and CO) and reaction of at least part of the char with oxygen to form CO.

Direct reduction of iron ore to at least partially reduced iron ore by gaseous products CO and $H_2$. These reactions in turn produce $CO_2$ and $H_2O$.

Reaction of part of the $CO_2$ with carbon to form CO (Boudouard reaction).

Oxidation of solids and gases such as char and particles of partially reduced metalliferous feed material, coal volatiles, CO, and $H_2$ with oxygen, which generates heat and promotes controlled agglomeration of smaller partially reduced ore particles with other particles within the fluidised bed.

The relative densities of the solids and the above-described injection of the solids and the gases, including the locations of the solids/gas injection, results in the formation of reaction zones within the vessel. The reaction zones may be contiguous.

One reaction zone is a carbon-rich zone 17 in the region of the lance tip 11 of the lance 9. In this zone the predominant reactions are oxidizing reactions involving combustion of char, coal volatiles, CO, and $H_2$ with oxygen which generate heat.

The other reaction zone is a metal-rich zone 19 in which (a) coal is devolatilised and forms char and coal volatiles and (b) iron ore fines are at least partially reduced by CO and $H_2$.

The above-described downward flow of solids in the annular region between the central region and the side wall facilitates transfer of heat from the carbon-rich zone to the metal rich zone.

In addition, the downward flow of solids partially shields the side wall from direct exposure to radiant heat from the central region of the vessel.

The above-described process also produces a stream of off-gas and entrained solids that is discharged from the vessel via an outlet 27 in an upper section of the vessel. The off-gas stream is processed by separating solids from the off-gas and returning the separated solids to the vessel via a solids return leg 29. Thereafter, the off-gas is treated by a series of steps of including (a) solids removal, (b) cooling the off-gas, (c) $H_2O$ removal, (d) $CO_2$ removal, (e) compression, and (f) reheating. The treated off-gas is thereafter returned to the vessel as part of the fluidising gas.

The above-described process produces a stream of solids, including at least partially reduced iron ore and char, that is discharged from the vessel via an outlet 25 in the base of the vessel. The solids stream may be processed by separating the at least partially reduced iron ore and a portion of the other solids. The other solids, predominantly char, separated from the product steam may also be returned to the vessel as a part of the solids feed for the process. The at least partially reduced iron ore is further processed as required. By way of example, the at least partially reduced iron ore may be supplied to a molten bath-based smelting vessel and smelted to molten iron, for example by a process such as the so called "HIsmelt process".

As is indicated above, the present invention was made during the course of an ongoing research project carried out by the applicant to develop CIRCOFER technology for the direct reduction of iron ore. The research project included a series of pilot plant runs on 350 mm diameter and 700 mm diameter pilot plant set-ups of the applicant.

The following discussion focuses on research work on the 700 mm diameter vessel pilot plant.

The pilot plant comprises an apparatus of the type shown in FIGS. 1 and 2. The pilot plant was operated as a circulating fluidised bed at atmospheric pressure. The vessel has a height of 10.7 m. An upper section of the vessel has a height of approximately 8.9 m and an internal diameter of 700 mm. A lower section of the vessel has a height of approximately 1.8 m and an internal diameter of 500 mm. This height of 1.8 m includes the height of a fluidising grate and a transition section between the 500 mm diameter and the 700 mm diameter sections. The vessel is refractory lined.

Off-gas from the vessel was processed to remove entrained solids by passing the off-gas successively through 3 cyclones connected in series. The first cyclone (cyclone 1) received off-gas directly from the vessel. Solids separated in the cyclone were returned to the vessel via a seal pot that provided for pressure sealing. The second cyclone (cyclone 2) received off-gas from cyclone 1. Solids separated in the cyclone were returned to the vessel via a direct return of solids (i.e. no seal pot). The third cyclone (cyclone 3) received off-gas from the second 2. Solids separated by cyclone 3 were not returned to the vessel.

After solids separation by the three cyclones, the off-gas was further treated by a radial flow scrubber, which further removed solids from the off-gas. These solids were concentrated by a thickener and then passed through a drum filter to produce thickener sludge.

Off-gas leaving the radial flow scrubber was then treated by a tube cooler that operated to dewater the off-gas by cooling it to within the range 10-30° C. Following treatment by the tube cooler, the off-gas was combusted.

The fluidised bed was fluidised by air during the initial stages of testing and was later fluidised by a mixture of nitrogen and hydrogen gas. As there were no provisions for processing and recycling the process off-gas, e.g. $CO_2$ removal and compression, it was not possible for it to be returned to the vessel as fluidising gas. In this regard, hydrogen gas was used to simulate the effect of using processed off-gas as fluidising gas.

In summary, the research work demonstrated the following:

The concept of a coal based fluidised bed reduction process with oxygen injection, producing a reduced product with metallisation levels of up to 78%.

Injecting oxygen into/or close to a fluidised bed with up to 42% metallic iron in the bed appears to be feasible without the formation of accretions.

The concept of simultaneously reducing iron ore and partially burning coal for energy in a single bed vessel appears to be feasible, at metallic iron loadings up to 48% in the product.

The position of the oxygen lance in the vessel is important because of the desirability of transferring the heat of oxidation back into the bed while minimising the level of iron reoxidation. The 4-m position is about right for the conditions tested.

High phosphorus Brockman iron ore was successfully fluidised and reduced without excessive dust make. (Brockman ore is a friable West Australian iron ore made available by Hamersley Iron Pty Ltd, Perth, Western Australia.)

Objectives of the Experimental Program:

The primary objective was to achieve stable operation for a significant amount of time with high phosphorus Brockman ore (−3 mm) and Blair Athol coal.

The plan was to operate with low iron ore feed (up to 20% in product discharge) for two days with the oxygen lance in a low position (1.9-m above the distributor plate (not shown in the Figure) of the vessel. The aim was then to operate for three days with high ore feed (up to 70% in the product) with the oxygen lance in an upper position (3.8-m above the distributor plate).

Start-up:

The campaign started on the 9 Dec. 2003 at 0600 hrs with a gradual heat up of the 700-mm vessel (hereinafter also referred to as a "CFB") using alumina as the bed material. Once the target temperature was reached, coal and oxygen were introduced into the vessel at 1550 hrs. The oxygen rate was increased up to 105 $Nm^3/hr$ while the coal rate was in the range 300-450 kg/hr.

Operation with Coal and Oxygen 10 Dec. 2003-11 Dec. 2003

Operation with coal, air and oxygen was conducted on 10 Dec. 2003. The operation was very smooth with the system stabilising fairly quickly and the vessel maintaining its temperature of 900-930° C. without any problems.

The standard operating conditions during this period were as follows.

CFB temperature: 930° C. bottom and 900° C. top
Fluidising gas flowrate: 140 $Nm^3/hr$ ($N_2$) and 300 $Nm^3/hr$ (air)
Pressure drop CFB: 80-140 mbar
Oxygen flowrate: up to 100 $Nm^3/hr$
$N_2$ shield gas flowrate: 30 $Nm^3/hr$
Coal Feed Rate: 340-450 kg/hr
A summary of the results is as follows:
Bed Discharge Rate: 100-160 kg/hr
Cyclone 3 Discharge: 10-14 kg/hr
Offgas Analysis

| $CO/CO_2$ | 12.8/8.7 = 1.47 |
|---|---|
| % $H_2$ | 7.6 |
| % $CH_4$ | 0.7 |

The discharge product was clean with only some small +2 mm pieces which looked like residual refractory material. The dust make was reasonably low with <10% of the discharge reporting to the final cyclone discharge.

Operation with Iron Ore (10-140 kg/hr), Coal and Oxygen (lance 2-m height) 10 Dec. 2003-12 Dec. 2003

10 Dec. 2003 2200-11 Dec. 2003 0600: Iron Ore at 10 kq/hr

Iron ore (<3-mm) was introduced into the feed system at 2200 on 10 Dec. 2003 at a rate of 10 kg-hr. Hydrogen was also introduced into the fluidising gas at a rate of 20 $Nm^3/hr$ to simulate use of processed off-gas as fluidising gas. The operation was smooth with the bed ΔP being maintained at about 100-120 mbar and the temperature profile having a range of only 10° C. between the bottom and the top of the bed.

The product appeared fine without any signs of accretions or agglomerates. However, on screening the product (at 2 mm) some larger scale type material was found but this was only a very small proportion of the overall product. The scale appeared to be made up of ash/char and probably formed on the walls of the vessel or distributor plate in the vessel.

The standard operating conditions and results during this period were as follows.

CFB temperatures: 930° C. bottom and 900° C. top
Fluidising gas flowrate: 350 $Nm^3/hr$ ($N_2$) and 20 $Nm^3/hr$ ($H_2$)
Pressure drop CFB: 100-130 mbar
Oxygen flowrate: 100-115 $Nm^3/hr$
$N_2$ shield gas flowrate: 30 $Nm^3/hr$
Coal Feed Rate: 280-360 kg/hr
Iron Ore Feed Rate: 10 kg/hr
A summary of the results is as follows:
Bed Discharge Rate: 125 kg/hr
Cyclone Discharge: 15 kg/hr
Offgas Analysis

| $CO/CO_2$ | 10.3/9.7 = 1.06 |
|---|---|
| % $H_2$ | 9.2 |
| % $CH_4$ | 2.0 |

11 Dec. 2003 0600-11 Dec. 2003 1200: Iron Ore at 20 kg/hr

The iron ore feed rate was increased up to 20 kg/hr at 0600 on 11 Dec. 2003 until 1200 11 Dec. 2003 and the hydrogen gas rate was also increased up to 40 $Nm^3/hr$. The operation continued to be smooth without any disruptions. The vessel bed pressure was being maintained at about 80-100 mbar and the temperature profile had a range of only 10° C. between the bottom and the top of the bed.

The appearance of the product continued to be good without any signs of accretions or agglomerates. As before the only exception to this was the odd piece of scale type material, which appeared to be composed of ash/char.

The standard operating conditions and results during this period were as follows.

CFB temperatures: 952° C. bottom and 940° C. top
Fluidising gas flowrate: 350 Nm$^3$/hr (N$_2$) and 40 Nm$^3$/hr
Pressure drop CFB: 80-100 mbar
Oxygen flowrate: 112 Nm$^3$/hr
N$_2$ shield gas flowrate: 30 Nm$^3$/hr
Coal Feed Rate: 430 kg/hr
Iron Ore Feed Rate: 20 kg/hr
A summary of the results is as follows:
Bed Discharge Rate: 125 kg/hr
Cyclone 3 Discharge: 15 kg/hr
Offgas Analysis

| | |
|---|---|
| CO/CO$_2$ | 11.5/9.6 = 1.2 |
| % H$_2$ | 14.1 |
| % CH$_4$ | 2.6 |

Product Analysis: (0900 11 Dec. 2003)

| | Mass % | Fe(T) | Fe$^{2+}$ | Fe° | % Met. |
|---|---|---|---|---|---|
| Magnetic | 9 | 58.2 | 15.5 | 42.35 | 72.8 |
| Non-Magnetic | 91 | 1.74 | | | |

11 Dec. 2003 1200-11 Dec. 2003 0600: Iron Ore at 40 kg/hr
Summary:

The iron ore feed rate was increased up to 40 kg/hr at 1200 on 11 Dec. 2003 and operated with this rate until 0600 11 Dec. 2003, while the hydrogen gas rate was maintained at 40 Nm$^3$/hr and the coal rate was around 360-420 kg/hr. The operation continued to be smooth without any disruptions and the iron product discharge was highly metallised. Dust make was also low with less than 10% of the total discharge coming from the final cyclone (i.e. cyclone 3). The vessel bed ΔP was being maintained at about 90-135 mbar and the temperature profile had a range of less than 10° C. between the bottom and the top of the bed.

Results

The appearance of the product continued to be good without any signs of accretions or agglomerates.

The standard operating conditions and results during this period were as follows.

CFB temperatures: 953° C. bottom and 941° C. top
Fluidising gas flowrate: 370 Nm$^3$/hr (N$_2$) and 40 Nm$^3$/hr (H$_2$)
Pressure drop CFB: 98-130 mbar
Oxygen flowrate: 113 Nm$^3$/hr
N$_2$ shield gas flowrate: 30 Nm$^3$/hr
Coal Feed Rate: 426 kg/hr
Iron Ore Feed Rate: 40 kg/hr
A summary of the results is as follows:
Bed Discharge Rate: 190-210 kg/hr
Cyclone 3 Discharge: 15-20 kg/hr
Offgas Analysis

| | |
|---|---|
| CO/CO$_2$ | 9.9/11.4 = 0.87 |
| % H$_2$ | 12.9 |
| % CH$_4$ | 2.9 |

Product Analysis: (11 Dec. 2003)

| | | Mass % | Fe(T) | Fe$^{2+}$ | Fe° | % Met. | % Fe° in Prod |
|---|---|---|---|---|---|---|---|
| 1500 | Magnetic | 30 | 74.38 | 14.59 | 57.44 | 77.2 | 25.8 |
| 11 Dec. 2003 | Non-magnetic | 70 | 4.95 | | | | |
| 1900 | Magnetic | 34.8 | 71.56 | 19.33 | 50.75 | 70.9 | 26.8 |
| 11 Dec. 2003 | Non-magnetic | 65.2 | 2.98 | | | | |
| 2300 | Magnetic | 27.4 | 66.4 | 20.22 | 45.66 | 68.8 | 21.1 |
| 11 Dec. 2003 | Non-magnetic | 72.6 | 4.03 | | | | |
| 0200 | Magnetic | 24.6 | 67.1 | 22.1 | 42.53 | 63.4 | 19.7 |
| 12 Dec. 2003 | Non-magnetic | 75.4 | 4.3 | | | | |
| 0600 | Magnetic | 19.6 | 68.86 | 22.55 | 43.48 | 61.8 | 15.7 |
| 12 Dec. 2003 | Non-magnetic | 80.4 | 2.73 | | | | |

The high metallisation achieved (70-77%) indicates that the oxygen lance (even at its 1.9-m position) did not penetrate too far to the bottom of the bed and that there was good segregation within the bed. The lower part of the bed is iron rich. The higher part of the bed is carbon rich and this is interacting with the oxygen lance to generate heat and this heat is then transferred back into the bed by the recirculation of the solids to the lower parts of the bed. The low CO/CO$_2$ ratio in the off-gas indicates achievement of high post combustion, with the energy levels being transferred back into the bed, while maintaining high metallisation levels in the product discharge.

The iron levels in the product and the degree of metallisation indicates that the 700-mm vessel can be operated in gasification mode with up to 20-25% metallic iron content without any problems with accretions. This is a significant achievement.

Oxygen Lance Inspection (11 Dec. 2003)

The lance was taken out of the 700-mm vessel and inspected on 11 Dec. 2003.

In summary, the lance was clean. The water cooled pipe as well as the nozzle tip had no evidence of any buildup of material.

The lance was repositioned in the vessel at a higher position i.e. 3.8-m above the distributor plate. The vessel was restarted with coal and oxygen and then once stabilised iron ore and hydrogen.

Operation with Iron Ore (110-200 kg/hr), Coal and Oxygen (lance 4-m height) 13 Dec. 2003-16 Dec. 2003

13 Dec. 2003 0600-13 Dec. 2003 1200: Iron Ore at 110 kg/hr
Summary:

The iron ore feed rate was increased stepwise up to 110 kg/hr at 0625 on 13 Dec. 2003 and operated with this rate until 1200 13 Dec. 2003 while the hydrogen gas rate was also increased stepwise up to 110 Nm$^3$/hr over a 2 hr period. The coal rate was around 360-400 kg/hr. The operation continued to be smooth without any disruptions and the iron product discharge from the vessel was up to 78% metallised. Dust make was also low with <10% of the total discharge coming from the final cyclone (i.e. cyclone 3). The vessel bed ΔP was being maintained at about 90-135 mbar and the temperature profile had a range of less than 5° C. between the bottom and the top of the bed.

Increasing the lance height from 1.9 m to 3.8 m did not seem to impact on the bed temperature profile. In fact, the temperature spread was less than 5° C. from top to bottom.

Results:

The appearance of the product continued to be good without any signs of accretions or agglomerates.

The standard operating conditions and results during this period were as follows.

CFB temperatures: 953° C. bottom and 951° C. top
Fluidising gas flowrate CFB 10 Nm$^3$/hr ($N_2$) at 860° C., 110 Nm$^3$/hr ($N_2$) at 740° C., 180 Nm$^3$/hr ($N_2$) at 680° C., and 110 Nm$^3$/hr ($H_2$) at 860° C.
Pressure drop CFB: 80-100 mbar
Oxygen flowrate: 110 Nm$^3$/hr
$N_2$ shield gas flowrate: 30-40 Nm$^3$/hr
Coal Feed Rate: 360-400 kg/hr
Iron Ore Feed Rate: 110 kg/hr
A summary of the results is as follows:
Bed Discharge Rate: 162 kg/hr
Cyclone 3 Discharge: 16 kg/hr
Offgas Analysis

| | |
|---|---|
| CO/CO$_2$ | 10.9/9.6 = 1.14 |
| % H$_2$ | 19.6 |
| % CH$_4$ | 2.3 |

Product Analysis: (13 Dec. 2003)

| | | Mass % | Fe(T) | Fe$^{2+}$ | Fe° | % Met. |
|---|---|---|---|---|---|---|
| 1200 | Magnetic | 37.8 | 76.42 | 14.98 | 59.33 | 77.6 |
| 13 Dec. 2003 | Non-magnetic | 62.2 | 2.66 | | | |

With the higher oxygen lance position the uniform bed temperature profile of the lower lance was maintained. This indicates that even with the oxygen lance at the 3.8 m position the solids recirculation profile is such that enough heat is transferred back into the bottom of the bed.

The temperature profile in the vessel and the cyclones indicated that there was probably no increase in dust make with the increase in iron ore feed rate up to 110 kg/hr. The discharge from the final cyclone relative to the vessel also did not change significantly. This suggests that either the iron ore is not breaking down as much as predicted or that any fines generated are re-agglomerated in the high temperature region of the oxygen lance.

13 Dec. 2003 1200-16 Dec. 2003 0500: Iron Ore at 120-230 kg/hr

Summary:

For the first period of this operation from 17:00 13 Dec. 2003 to 12:00 15 Dec. 2003 the operation rate was approximately 120 kg/h iron ore feed. This included a period of disturbance where there was no feed. The final period operated at approximately 230 kg/h iron ore feed.

The operation with 230 kg/hr iron ore feed rate was smooth without any disruptions and the iron product discharge from the CFB ranged from 48% to 78% metallised. Dust make was also low with <10% of the total discharge, coming from cyclone 3. The vessel bed ΔP was being maintained at about 80-100 mbar and the temperature profile range had now increased to about 20° C. between the bottom and the top of the bed.

Operating the vessel at the higher iron ore feed rate of 200 kg/hr increased the range of the CFB temperature profile with the bottom part of the bed now being up to 20° C. colder than the middle of the bed. The metallisation levels were also lower at the higher iron ore feed rates but they were still in the 60-80% metallisation range.

Results:

The appearance of the product continued to be good without any signs of accretions or agglomerates.

The standard operating conditions and results during this period were as follows.

CFB temperatures: 947° C. bottom and 960° C. top
FB gas heater temperature: 740° C. and 615° C. main heater
Fluidising gas flowrate CFB: 20 Nm$^3$/hr ($N_2$) at 840° C., 100 20 Nm$^3$/hr ($N_2$) at 740° C., 185 20 Nm$^3$/hr ($N_2$) at 615° C., and 140 Nm$^3$/hr ($H_2$) @ 840° C.
Pressure drop CFB: 83-96 mbar
Oxygen flowrate: 113 Nm$^3$/hr
$N_2$ shield gas flowrate: 30-40 Nm$^3$/hr
Coal Feed Rate: 380 kg/hr
Iron Ore Feed Rate: 200 kg/hr
A summary of the results is as follows:
Bed Discharge Rate: 227-286 kg/hr
Cyclone 3 Discharge: 18-24 kg/hr
Offgas Analysis (0400 hrs 15 Dec. 2003)

| | |
|---|---|
| CO/CO$_2$ | 11/10.4 = 1.06 |
| % H$_2$ | 16.5 |
| % CH$_4$ | 1.4 |

Product Analysis: (13-15 Dec. 2003)

| | | Mass % | C(T) | Fe(T) | Fe$^{2+}$ | Fe° | % Met. |
|---|---|---|---|---|---|---|---|
| 1700 | Magnetic | 40.2 | — | 75.55 | 22.1 | 51.37 | 68.0 |
| 13 Dec. 2003 | Non-magnetic | 59.8 | — | 8.11 | | | |
| 2000 | Magnetic | 54.2 | 1.8 | 78.35 | 15.33 | 61.18 | 78.1 |
| 13 Dec. 2003 | Non-magnetic | 45.8 | 80.3 | 5.03 | | | |
| 1700 | Cyclone 3 | | | 12.89 | 2.73 | 2.47 | 19.2 |
| 13 Dec. 2003 | discharge | | | | | | |
| 2000 | Cyclone 3 | | | 15.74 | 3.12 | 6.67 | 42.4 |
| 13 Dec. 2003 | Discharge | | | | | | |
| 0200 | Magnetic | 51.3 | — | 78.85 | 19.6 | 58.87 | 74.7 |
| 15 Dec. 2003 | Non-magnetic | 48.7 | — | 7.29 | | | |

-continued

|  |  | Mass % | C(T) | Fe(T) | Fe²⁺ | Fe° | % Met. |
|---|---|---|---|---|---|---|---|
| 0500 15 Dec. 2003 | Magnetic | 57.2 | — | 77.44 | 17.27 | 57.65 | 74.4 |
| 15 Dec. 2003 | Non-magnetic | 42.8 | — | 4.55 |  |  |  |
| 0700 15 Dec. 2003 | Magnetic | 62.8 | 0.9 | 76.93 | 17.38 | 58.43 | 75.9 |
| 15 Dec. 2003 | Non-magnetic | 37.2 | 72.5 | 11.25 |  |  |  |
| 0200 15 Dec. 2003 | Cyclone 3 Discharge |  |  | 20.29 | 7.77 | 5.38 | 26.5 |
| 0500 15 Dec. 2003 | Cyclone 3 Discharge |  |  | 21.73 | 7.69 | 6.28 | 28.9 |
| 12:00 15 Dec. 2003 | Magnetic | 59.2 | — | 76.9 | 18.1 | 56.6 | 73.6 |
| 15 Dec. 2003 | Non-Magnetic | 40.8 | — | 31.0 | 4.7 | 22.0 | 70.9 |
| 16:00 15 Dec. 2003 | Magnetic | 62.7 | 1.9 | 73.6 | 32.5 | 36.0 | 48.9 |
| 15 Dec. 2003 | Non-Magnetic | 37.3 | 53.6 | 27.6 | 8.4 | 13.2 | 48.0 |
| 22:00 15 Dec. 2003 | Magnetic | 59.6 | — | 71.5 | 28.0 | 39.0 | 54.5 |
| 15 Dec. 2003 | Non-Magnetic | 40.4 | — | 20.4 | 3.9 | 11.0 | 54.0 |
| 02:00 16 Dec. 2003 | Magnetic | 53.3 | — | 74.1 | 26.8 | 43.5 | 58.7 |
| 16 Dec. 2003 | Non-Magnetic | 46.7 | — | 13.7 | 3.7 | 2.8 | 20.1 |
| 04:00 16 Dec. 2003 | Magnetic | 62.7 | 1.6 | 74.4 | 29.5 | 40.0 | 53.8 |
| 16 Dec. 2003 | Non-Magnetic | 37.3 | 63.8 | 16.8 | 5.7 | 5.4 | 32.2 |

At the high iron ore feed rates (200 kg/hr) the discharge from the vessel increased significantly while the discharge from the final cyclone only increased slightly. However, the discharge from the final cyclone relative to the vessel did not seem to change. It was further observed that the amount of fines <0.1 mm in the discharge was lower than the amount of fines <0.1 mm in the feed. This suggests that either the iron ore is not breaking down as much as predicted or that any fines generated are re-agglomerated in the high temperature region of the oxygen lance. The temperature profile through the cyclones also supports this since there were no significant increases in temperatures through the cyclone system at the higher iron ore feed rates. The product metallisation levels were maintained in the range of 68-78% during the high iron ore feed rates while the product discharge had up to 48% metallic iron.

Oxygen Lance and Vessel Inspection (16 Dec. 2003 and 19 Dec. 2003)

The lance was taken out of the 700-mm vessel and inspected on 16 Dec. 2003. In summary, the lance was fairly clean. The water cooled pipe had a thin coating of material while the nozzle tip was relatively clean. The nature of the build up (flaky and thin) suggested that this would not lead to any operational problems.

Iron Distribution & Agglomeration

Analysis of the Brockman ore sample used as feed to the fluidised bed indicated a fines content of approximately 10.6% sub 45 micron. These units were expected to appear as output from cyclone 3 or as thickener sludge. Due to the friable nature of Brockman Ore, it was expected that additional fines would be produced during processing. It was therefore expected that the percentage of iron units exiting the system through cyclone 3 would exceed 10.6%.

It was observed that approximately 7% of the iron units input to the fluidised bed were discharged through cyclone 3, either as direct output from cyclone 3 (approximately 4%) or as output from the radial flow scrubber (approximately 3%). Analysis of the main product output from the fluidised bed indicated that an agglomeration mechanism was present within the process. This mechanism appeared to be primarily smaller particles, typically sub 100 micron particles, agglomerating to each other and larger particles.

Many modifications may be made to the embodiments of the present invention shown in FIGS. 1 and 2 without departing from the spirit and scope of the invention.

The invention claimed is:

1. A circulating fluidized bed process for direct reduction of a metalliferous material which comprises supplying the metalliferous material, a solid carbonaceous material, an oxygen-rich gas, and a fluidizing gas into a fluidized bed in a vessel and maintaining the fluidized bed in the vessel, at least partially reducing metalliferous material in the vessel, and discharging a product stream that comprises the at least partially reduced metalliferous material from the vessel, comprising:
   (a) reducing the metalliferous material in a solid state in a metal-rich zone in the vessel;
   (b) injecting the oxygen-rich gas into a carbon-rich zone in the vessel with a downward flow in a range of up to 40 degrees to the vertical and generating heat by reactions between oxygen and the metalliferous material, the solid carbonaceous material and other oxidizable solids and gases in the fluidized bed, and
   (c) transferring heat from the carbon-rich zone to the metal-rich zone by movement of solids within the vessel,
   and wherein the vessel has an upper section, a lower section, and an intermediate section, the intermediate section is intermediate said lower section and said upper section of the vessel, and the metal-rich zone is formed in the lower section of the vessel and the carbon-rich zone is formed in the intermediate section of the vessel,
   the oxygen-rich gas is injected into the carbon-rich zone in the vessel at a location that is spaced horizontally from walls of the vessel using a water-cooled lance,
   the process comprises withdrawing gas and entrained solids from the upper section of the vessel, separating solids from the withdrawn gas, and recirculating the separated solids to the vessel,
   the metalliferous material and the solid carbonaceous material are supplied to the fluidized bed through a common solids delivery device,
   the oxygen-rich gas comprises at least 90% by volume oxygen, and the metalliferous material is supplied into the fluidized bed as particles that are distinct from the carbonaceous material.

2. A process according to claim 1, comprising injecting the oxygen-containing gas into a central region in the vessel.

3. A process according to claim 1, comprising controlling operation such that the temperature difference between the bulk temperature in the fluidized bed and the average temperature of the inwardly facing surface of a side wall of the vessel is no more than 100° C.

4. A process according to claim 1, wherein the metalliferous material is in the form of iron ore fines, and the bulk temperature in the fluidized bed is in the range 850° C. to 1000° C.

5. A process according to claim 4, wherein the bulk temperature in the fluidized bed is at least 900° C.

6. A process according to claim 1, comprising controlling operation such that the temperature variation is less than 50° C. within the fluidized bed.

7. A process according to claim 1, wherein the metalliferous material is in the form of iron ore fines, and the pressure in the vessel is controlled to be in the range of 1-10 bar absolute.

8. A process according to claim 1, comprising injecting the oxygen-rich gas via at least one lance having a lance tip with an outlet positioned in the vessel inwardly of the side wall of the vessel in the central region of the vessel.

9. A process according to claim 8, wherein the lance tip is directed vertically downwardly.

10. A process according to claim 8, wherein at least the lance tip is water-cooled.

11. A process according to claim 8, wherein an outer surface of the lance is water-cooled.

12. A process according to claim 8, wherein the oxygen-rich gas is injected through a central pipe of the lance.

13. A process according to claim 8, wherein the oxygen-rich gas is injected with sufficient velocity to form a substantially solids-free zone in the region of the lance tip.

14. A process according to claim 8, comprising injecting a shrouding gas for shrouding the region of the outlet of the lance tip.

15. A process according to claim 14, wherein the shrouding gas is injected into the vessel at a velocity that is at least 60% of the velocity of the oxygen-containing gas.

16. A process according to claim 1, comprising supplying the metalliferous feed material, the carbonaceous material, the oxygen-rich gas, and the fluidizing gas to the fluidized bed and maintaining the fluidized bed with (a) a downward flow of the oxygen-rich gas, (b) an upward flow of solids and fluidizing gas countercurrent to the downward flow of the oxygen-rich gas, and (c) a downward flow of solids outwardly of the upward flow of solids and fluidizing gas.

17. A process according to claim 16, comprising heating solids in the upward and downward flows of solids by heat generated by reactions between the oxygen-rich gas, the solid carbonaceous material and other oxidizable materials in the carbon-rich zone.

18. A process according to claim 16, wherein the upward and downward flows of solids shield the side wall of the vessel from radiant heat generated by reactions between the oxygen-rich gas and the solid carbonaceous material and other oxidizable solids and gases in the fluidized bed.

19. A process according to claim 1, wherein the metalliferous material is in the form of iron ore fines sized at minus 6 mm.

20. A process according to claim 19, wherein the fines have an average particle size in the range of 0.1 to 0.8 mm.

21. A process according to claim 1, wherein the carbonaceous material is coal.

22. A process according to claim 1, wherein the fluidizing gas comprises a reducing gas.

23. A process according to claim 22, wherein the fluidizing gas comprises CO and $H_2$ and the amount of $H_2$ in the fluidizing gas is at least 15% by volume of the total volume of CO and $H_2$ in the gas.

24. A process according to claim 1, wherein the product stream comprising at least partially reduced metalliferous material is discharged from the lower section of the vessel.

25. A process according to claim 24, wherein the product stream also comprises other solids, and the process comprises separating at least a portion of the other solids from the product stream.

26. A process according to claim 25, wherein the separated solids are returned to the vessel.

27. A process according to claim 1, comprising returning the separated solids to the lower section of the vessel.

28. A process according to claim 1, wherein metalliferous feed material is preheated with the off-gas from the vessel.

29. A process according to claim 28, wherein the off-gas is treated after the preheating step and at least a portion of the treated off-gas is returned to the vessel as the fluidizing gas.

30. A process according to claim 29, wherein the off-gas treatment comprises one or more of (a) solids removal, (b) cooling, (c) $H_2O$ removal, (d) $CO_2$ removal, (e) compression, and (f) reheating.

31. A process according to claim 29, wherein the off-gas treatment comprises returning solids to the vessel.

32. A process according to claim 1, wherein the metallization of the product stream is greater than 50%, and the process comprises operating with reducing gas in the fluidizing gas.

33. A process according to claim 1, comprising an additional smelting process for melting and further reducing the partially reduced metalliferous material to a molten metal.

34. A process according to claim 1, comprising returning the separated solids to the intermediate section of the vessel.

35. A circulating fluidized bed process for direct reduction of a metalliferous material which comprises:
  supplying the metalliferous material and a solid carbonaceous material into a vessel above a lower end region of the vessel through a common solids delivery device, wherein the metalliferous material is supplied into the vessel as particcles that are distinct from the carbonaceous material
  supplying a fluidizing gas into the vessel at the lower end region of the vessel for maintaining a fluidized bed in the vessel,
  wherein the metalliferous material is supplied into the vessel as particles that are distinct from the carbonaceous material,
  injecting an oxygen-rich gas comprising at least 90% by volume oxygen into the vessel at a location above that at which the solid carbonaceous material is supplied to the vessel with a downward flow in a range of up to 40 degrees to the vertical using a water-cooled lance,
  withdrawing gas and entrained solids from an upper section of the vessel,
  separating solids from the withdrawn gas,
  recirculating the separated solids to the vessel, and
  discharging a product stream from the lower end region of the vessel,
  whereby the oxygen-rich gas is directed into a carbon-rich zone in the vessel at a location that is spaced horizontally from walls of the vessel and heat is generated in the carbon-rich zone by reactions between oxygen and at least the solid carbonaceous material,
  heat is transferred from the carbon-rich zone to a metal-rich reducing zone in the lower end region of the vessel by movement of solids within the vessel,
  metalliferous material in the solid state is at least partially reduced in the reducing zone, and the product stream that is discharged from the lower end region of the vessel comprises the at least partially reduced metalliferous material.

36. A process according to claim 35, comprising returning the separated solids to the intermediate section of the vessel.

37. A circulating fluidized bed process for direct reduction of a metalliferous material, comprising:

providing a vessel having an upper section, a lower section, and an intermediate section, the intermediate section being intermediate said lower section and said upper section of the vessel, supplying the metalliferous material and a solid carbonaceous material to the intermediate section of the through a common solids delivery device, wherein the metalliferous material is supplied to the vessel as particles that are distinct from the carbonaceous material, injecting an oxygen-rich gas comprising at least 90% by volume oxygen downwardly into the intermediate section of the vessel at a location that is horizontally spaced from walls of the vessel using a water-cooled lance, injecting a fluidizing gas into the lower section of the vessel, the fluidizing gas being a reducing gas, withdrawing gas and entrained solids from the upper section of the vessel, separating solids from the withdrawn gas, recirculating the separated solids to the vessel, and discharging a product stream from the lower section of the vessel, whereby injection of the fluidizing gas establishes and maintains a fluidized bed in the vessel and creates a reducing region in the lower section of the vessel in which metalliferous material is at least partially reduced in the solid state, injection of the oxygen-rich gas into the intermediate section of the vessel creates an oxidizing region in the intermediate section of the vessel in which heat is generated by reactions between oxygen and the metalliferous material, the solid carbonaceous material and other oxidizable solids and gases in the fluidized bed, movement of solids within the vessel transfers heat from the oxidizing region to the reducing region, and the product stream comprises the at least partially reduced metalliferous material.

38. A method according to claim 37, comprising treating the withdrawn gas to remove $H_2O$ and $CO_2$ and injecting the treated gas into the lower section of the vessel as fluidizing gas.

39. A method according to claim 37 comprising scrubbing the withdrawn gas to remove residual solids, dewatering the scrubbed gas, and combusting the dewatered gas.

40. A method according to claim 37, comprising melting and further reducing the product stream discharged from the lower section of the vessel.

41. A process according to claim 37, comprising returning the separated solids to the intermediate section of the vessel.

* * * * *

UNITED STATES PATENT AND TRADEMARK OFFICE
CERTIFICATE OF CORRECTION

| | |
|---|---|
| PATENT NO. | : 8,038,766 B2 |
| APPLICATION NO. | : 11/569736 |
| DATED | : October 18, 2011 |
| INVENTOR(S) | : Andreas Orth |

Page 1 of 1

It is certified that error appears in the above-identified patent and that said Letters Patent is hereby corrected as shown below:

Claim 35, line 7 (Column 16, line 39), "particcles" should be --particles--.

Claim 37, line 8 (Column 17, line 14), after "of the" should be inserted --vessel--.

Signed and Sealed this
Tenth Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,038,766 B2 | |
| APPLICATION NO. | : 11/569736 | |
| DATED | : October 18, 2011 | |
| INVENTOR(S) | : Andreas Orth | |

It is certified that error appears in the above-identified patent and that said Letters Patent is hereby corrected as shown below:

Claim 35, line 8 (Column 16, line 39) "material" should be --material,--.

Claim 35, lines 12-14 (Column 16, lines 44-46) should be deleted.

Signed and Sealed this
Seventeenth Day of July, 2012

David J. Kappos
*Director of the United States Patent and Trademark Office*